US 9,183,754 B2

(12) United States Patent
Tanaka

(10) Patent No.: US 9,183,754 B2
(45) Date of Patent: Nov. 10, 2015

(54) MUSIC SCORE DISPLAY DEVICE, MUSIC SCORE DISPLAY METHOD AND STORAGE MEDIUM

(71) Applicant: Casio Computer Co., Ltd., Tokyo (JP)

(72) Inventor: Takahiro Tanaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 226 days.

(21) Appl. No.: 13/741,676

(22) Filed: Jan. 15, 2013

(65) Prior Publication Data

US 2013/0186259 A1    Jul. 25, 2013

(30) Foreign Application Priority Data

Jan. 20, 2012 (JP) ................. 2012-010059

(51) Int. Cl.
*G09B 15/02* (2006.01)

(52) U.S. Cl.
CPC .................... *G09B 15/023* (2013.01)

(58) Field of Classification Search
CPC ............ G06F 3/1242; H04N 21/8113; H04N 1/00129; G06T 11/206; G10H 2220/015; G10H 2220/101; G10H 2220/121; G10H 2220/126; G10H 2220/116; G10H 2240/145; G10G 1/00
See application file for complete search history.

(56) References Cited

U.S. PATENT DOCUMENTS

| | | | | |
|---|---|---|---|---|
| 5,396,828 A * | 3/1995 | Farrand | | 84/462 |
| 5,533,903 A * | 7/1996 | Kennedy | | 434/307 R |
| 6,235,979 B1 * | 5/2001 | Yanase | | 84/477 R |
| 6,275,222 B1 * | 8/2001 | Desain | | 715/202 |
| 6,281,420 B1 * | 8/2001 | Suzuki et al. | | 84/477 R |
| 7,129,407 B2 | 10/2006 | Hiratsuka et al. | | |
| 7,453,035 B1 * | 11/2008 | Evans et al. | | 84/477 R |
| 7,495,165 B2 * | 2/2009 | Suzuki et al. | | 84/622 |
| 7,539,941 B2 * | 5/2009 | Suzuki et al. | | 715/716 |
| 7,608,775 B1 * | 10/2009 | Evans | | 84/611 |
| 7,640,501 B2 * | 12/2009 | Suzuki et al. | | 715/723 |
| 7,994,411 B2 * | 8/2011 | Osada | | 84/609 |

(Continued)

FOREIGN PATENT DOCUMENTS

| | | |
|---|---|---|
| CN | 1542732 A | 11/2004 |
| JP | 2007-193068 A | 8/2007 |

(Continued)

OTHER PUBLICATIONS

Japanese Office Action dated Dec. 3, 2013 (and English translation thereof) in counterpart Japanese Application No. 2012-010059.

(Continued)

*Primary Examiner* — Marlon Fletcher

(74) *Attorney, Agent, or Firm* — Holtz, Holtz, Goodman & Chick PC

(57) ABSTRACT

A music score display device displays a music score representing a predetermined piece of music at a display, and stores a playing result for each measure of the music score in a memory when the piece is played. On the basis of the playing results of the measures stored in the memory, the music score display device generates graph images representing the playing results of the measures, and displays the generated graph images of the measures, superposed on images of the corresponding measures of the music score displayed at the display, such that the images of the measures are visible.

9 Claims, 7 Drawing Sheets

(56) References Cited

U.S. PATENT DOCUMENTS

| | | | |
|---|---|---|---|
| 8,445,766 B2* | 5/2013 | Raveendran | 84/477 R |
| 8,586,848 B2* | 11/2013 | Sasaki | 84/609 |
| 2003/0110926 A1* | 6/2003 | Sitrick et al. | 84/477 R |
| 2004/0074376 A1* | 4/2004 | Varme | 84/483.2 |
| 2004/0221707 A1 | 11/2004 | Hiratsuka et al. | |
| 2011/0003638 A1* | 1/2011 | Lee et al. | 463/35 |
| 2011/0023688 A1* | 2/2011 | Daisy | 84/483.1 |
| 2011/0203442 A1* | 8/2011 | Raveendran | 84/483.1 |
| 2011/0247479 A1* | 10/2011 | Helms et al. | 84/613 |
| 2012/0227571 A1* | 9/2012 | Sasaki | 84/477 R |
| 2014/0000438 A1* | 1/2014 | Feis et al. | 84/453 |

FOREIGN PATENT DOCUMENTS

| | | |
|---|---|---|
| JP | 3988633 B2 | 10/2007 |
| JP | 4626307 B2 | 2/2011 |
| JP | 2011-059309 A | 3/2011 |

OTHER PUBLICATIONS

Chinese Office Action dated Sep. 29, 2014, issued in counterpart Chinese Application No. 201310016089.6.

* cited by examiner

| ACHIEVEMENT LEVEL (%) | GRADATION |
|---|---|
| 0 | START COLOR |
| ⋮ | ⋮ |
| 100 (COST) | FINISH COLOR |

MUSIC SCORE DISPLAY DEVICE, MUSIC SCORE DISPLAY METHOD AND STORAGE MEDIUM

This application is based upon and claims the benefit of priority from the prior Japanese Patent Application No. 2012-010059, filed Jan. 20, 2012, and the entire contents of which are incorporated herein by reference.

BACKGROUND OF THE INVENTION

Field of the Invention

The present invention relates to a music score display device, a music score display method and a storage medium.

Heretofore, a music score display device has been known with which a beginner who is inexperienced in using a keyboard without reading a music score may practice playing the keyboard (see Japanese Unexamined Patent Publication (JP-A) No. 2007-193068). In this music score display device, a keyboard is displayed at the upper side of a music score display region and navigates between the keys that should be pressed.

However, in JP-A No. 2007-193068, only the keys that should be played next are displayed. When a player is practicing playing, if the player cannot check which parts of the piece that they are trying to play they are playing comparatively well, which parts they are playing badly, how much they have played the piece and the like while practicing, rapid improvement is uncertain.

Accordingly, displaying states of practice, results of previous playing and the like in the area in which JP-A No. 2007-193068 displays the navigation image has been considered. However, because this area is at the upper side of the music score display region, images in this area may not be noticed when the player's eyes are directed at the music score. Naturally, displaying only images that show states of practice, results of previous plays and the like has been considered. However, this is fundamentally divergent from the general process of playing while looking at a music score.

SUMMARY OF THE INVENTION

Accordingly, an object of the present invention is to provide a music score display device, music score display method and storage method with which results of previous playing and the like may be checked while a music score is being viewed and with which states of playing practice may be intuitively understood.

In order to achieve the object described above, an aspect of the music score display device of the present invention includes:

a display controller that displays a music score representing a predetermined piece of music at a predetermined display;

a memory that stores a playing result for each of measures of the music score when the predetermined piece of music is played;

a graph image generator that, on the basis of the playing result of the each measure stored in the memory, generates a graph image representing the playing result of the each measure; and an overlay display that displays the graph image of the each measure generated by the graph image generator, superposed on an image of the corresponding measure of the music score displayed at the predetermined display, such that the image of the measure is visible.

An aspect of the music score display method of the present invention includes:

displaying a music score representing a predetermined piece of music at a predetermined display;

storing a playing result for each of measures of the music score in a memory when the predetermined piece of music is played;

on the basis of the playing result of the each measure stored in the memory, generating a graph image representing the playing result of the each measure; and displaying the generated graph image of the each measure, superposed on an image of the corresponding measure of the music score displayed at the predetermined display, such that the image of the measure is visible.

An aspect of the storage medium of the present invention stores a program executable by a computer that controls a music score display device equipped with a memory that, when a predetermined piece of music is played, stores a playing result for each of measures of a music score, the program causing the computer to execute:

a display control step that displays the music score representing the predetermined piece of music at a predetermined display;

a graph image generation step that, on the basis of the playing result of the each measure stored in the memory, generates a graph image representing the playing result of the each measure; and an overlay display step that displays the generated graph image of the each measure, superposed on an image of the corresponding measure of the music score displayed at the predetermined display, such that the image of the measure is visible.

DETAILED DESCRIPTION OF THE INVENTION

Herebelow, an embodiment of the present invention is described with reference to the attached drawings.

Figure 1:
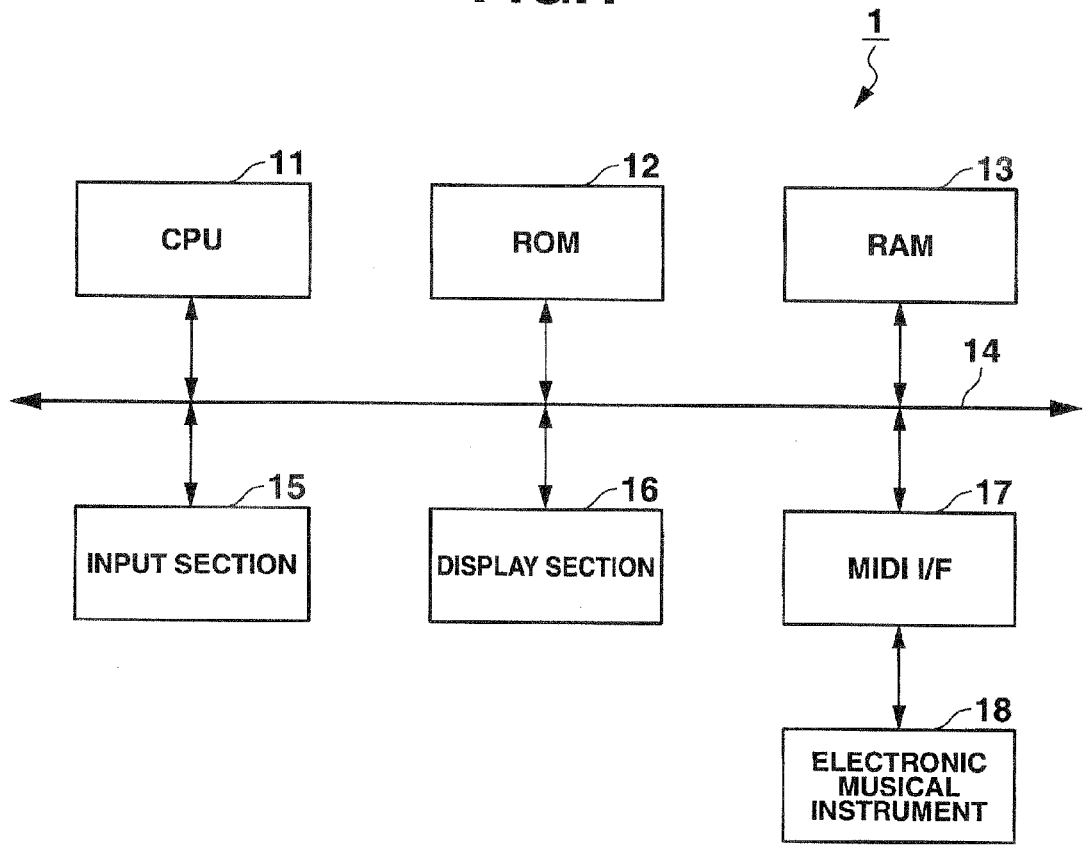
FIG. 1 is a block diagram showing hardware structures of a music score display device in accordance with the embodiment of the present invention.

FIG. 1 is a block diagram showing hardware structures of a music score display device in accordance with the embodiment of the present invention.

A music score display device 1 is equipped with a central processing unit (CPU) 11, a read-only memory (ROM) 12, a random access memory (RAM) 13, a bus 14, an input section 15, a display section 16, a musical instrument digital Interface (MIDI interface) 17, and an electronic musical instrument 18.

The CPU 11 performs overall control of the music score display device 1 and executes various processes in accordance with a program stored in the ROM 12 or a program read into the RAM 13 from the ROM 12.

The ROM 12 stores processing programs for various processes to be executed by the CPU 11. The RAM 13 stores programs and like that been read from the ROM 12.

The CPU 11, the ROM 12 and the RAM 13 are connected to one another via the bus 14. The input section 15, the display section 16 and the MIDI interface 17 are also connected to the bus 14.

The input section 15 is structured with, for example, buttons and the like, and receives the input of various kinds of information in accordance with operation instructions from a user.

The display section 16 displays information of various settings, information relating to playing operations and the like in accordance with control by the CPU 11.

The MIDI interface 17 is connected to the electronic musical instrument 18. The MIDI interface 17 sends data relating to model playing and the like to the electronic musical instrument 18.

The electronic musical instrument 18 sends pitch data generated by playing operations by a player to the MIDI interface 17.

Figure 2:
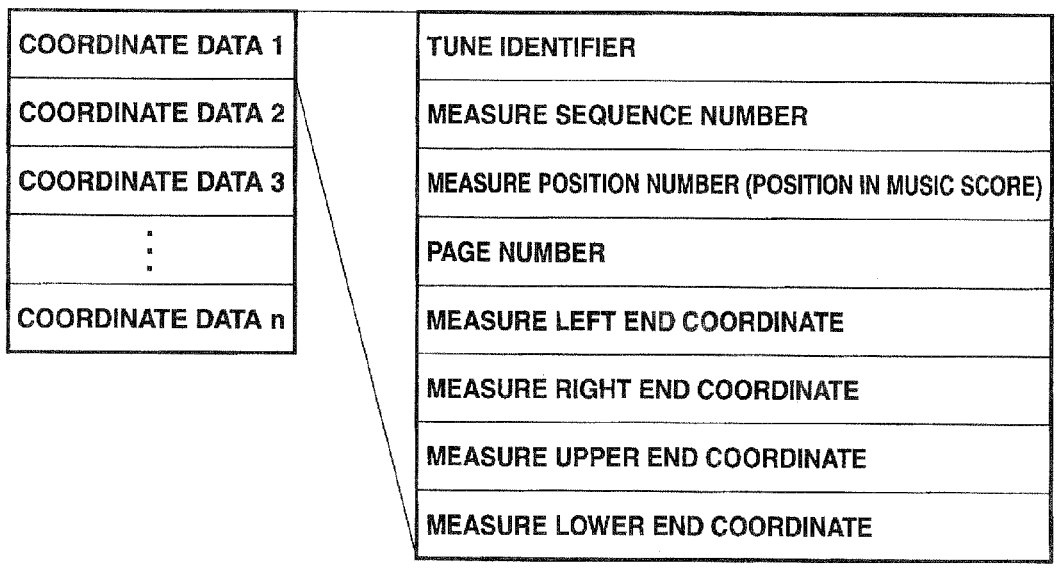
FIG. 2 is a diagram showing the structure of a coordinate data table in accordance with the embodiment of the present invention.

FIG. 2 is a diagram showing the structure of a coordinate data table in accordance with the embodiment of the present invention.

The coordinate data table is stored in the RAM 13 and is structured of n records of coordinate data, from coordinate data 1 to coordinate data n. Each coordinate data record is structured with a tune identifier, a measure sequence number, a measure position number, a page number, a measure left end coordinate, a measure right end coordinate, a measure upper end coordinate and a measure lower end coordinate.

The tune identifier is a character string for identifying the tune being played on the electronic musical instrument 18. The measure sequence number is a serial number of a measure, taking account of repeated sections, and the measure position number is a number representing a position of the measure on a music score. According to a music score in FIG. 9a, there are 24 measures, of which the section from the ninth measure to the twenty-fourth measure is played twice. Therefore, the number of measures including repeat plays is 40 measures. For example, the ninth measure in the music score, when being played for the first time, has the same measure sequence number and measure position number, which are "9", and when being played for the second time has the measure sequence number "25" and the measure position number "9".

The page number is the number of a page of the music score on which the measure represented by the measure position number appears. The measure left end coordinate is the coordinate of the left side of a display region in the music score of the measure represented by the measure position number. The measure right end coordinate is the coordinate of the right side of the display region of the measure, the measure upper end coordinate is the coordinate of the upper side of the display region of the measure, and the measure lower end coordinate is the coordinate of the lower side of the display region of the measure. The number n of coordinate data records is the total count of the measure sequence numbers.

Figure 3:
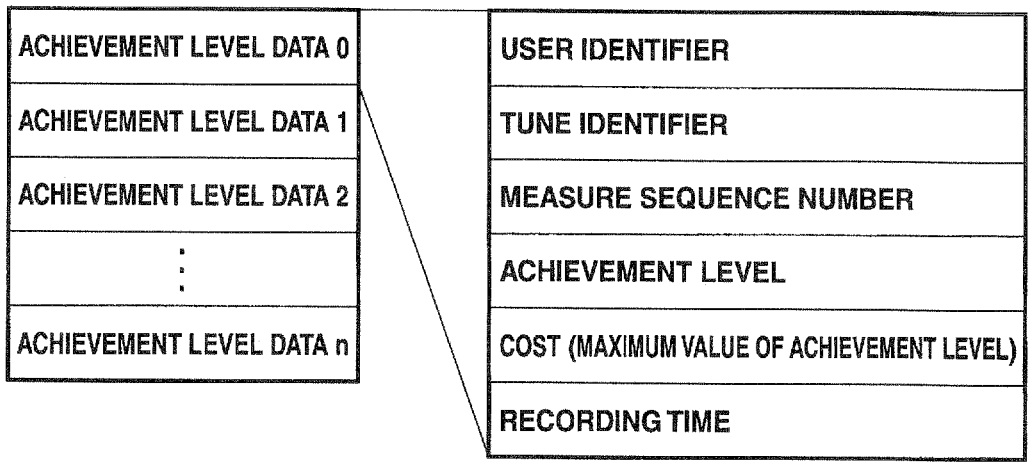
FIG. 3 is a diagram showing the structure of an achievement level data table in accordance with the embodiment of the present invention.

FIG. 3 is a diagram showing the structure of an achievement level data table in accordance with the embodiment of the present invention.

The achievement level data table is stored in the RAM 13, and is structured with n+1 records of achievement level data for each measure sequence number, from achievement level data 0 to achievement level data n. Each achievement level data record is structured with a user identifier, a tune identifier, a measure sequence number, an achievement level, a cost (a maximum value of the achievement level) and a recording time.

The achievement level data is arranged in the order in which it was practised, with the data for each measure sequence number corresponding to a last (most recent) practice being achievement level data 0 and the data corresponding to a first practice being achievement level data n.

The user identifier is a character string for identifying a user playing on the electronic musical instrument 18. The tune identifier is a character string for identifying the tune being played on the electronic musical instrument 18. The measure sequence number is the sequence number of a measure, taking account of repeat plays as described above for FIG. 2. The achievement level is a score attained when the measure with this measure sequence number was played. The cost is a maximum value of the achievement level, which is the score if the measure with this measure sequence number is played correctly. The recording time is a time at which the achievement level data was recorded.

Figure 4:
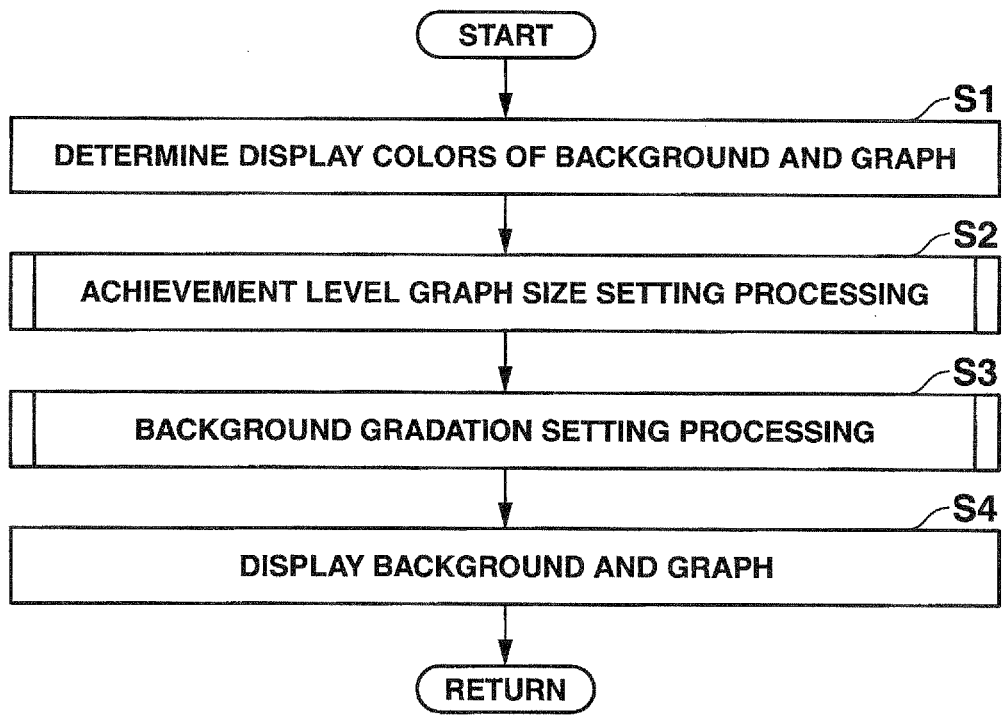
FIG. 4 is a flowchart showing a main flow of processing that is executed in the music score display device in accordance with the embodiment of the present invention.

FIG. 4 is a flowchart showing a main flow of processing that is executed in the music score display device in accordance with the embodiment of the present invention.

In step S1, the CPU 11 determines display colors of a background and a graph. Herein, the background is a gradation image that is overlaid on a measure image in a music score. In the present embodiment, gradations of semi-transparent gray are selected as the background display color and semi-transparent pink is selected as the graph display color.

In step S2, the CPU 11 carries out achievement level graph size setting processing, which is described below. In step S3, the CPU 11 carries out background gradation setting processing, which is described below.

In step S4, the CPU 11 implements display of the background and graph. Specifically, a background and graph specified by the achievement level graph size setting processing of step S2 and the background gradation setting processing of step S3 are displayed.

Figure 5:
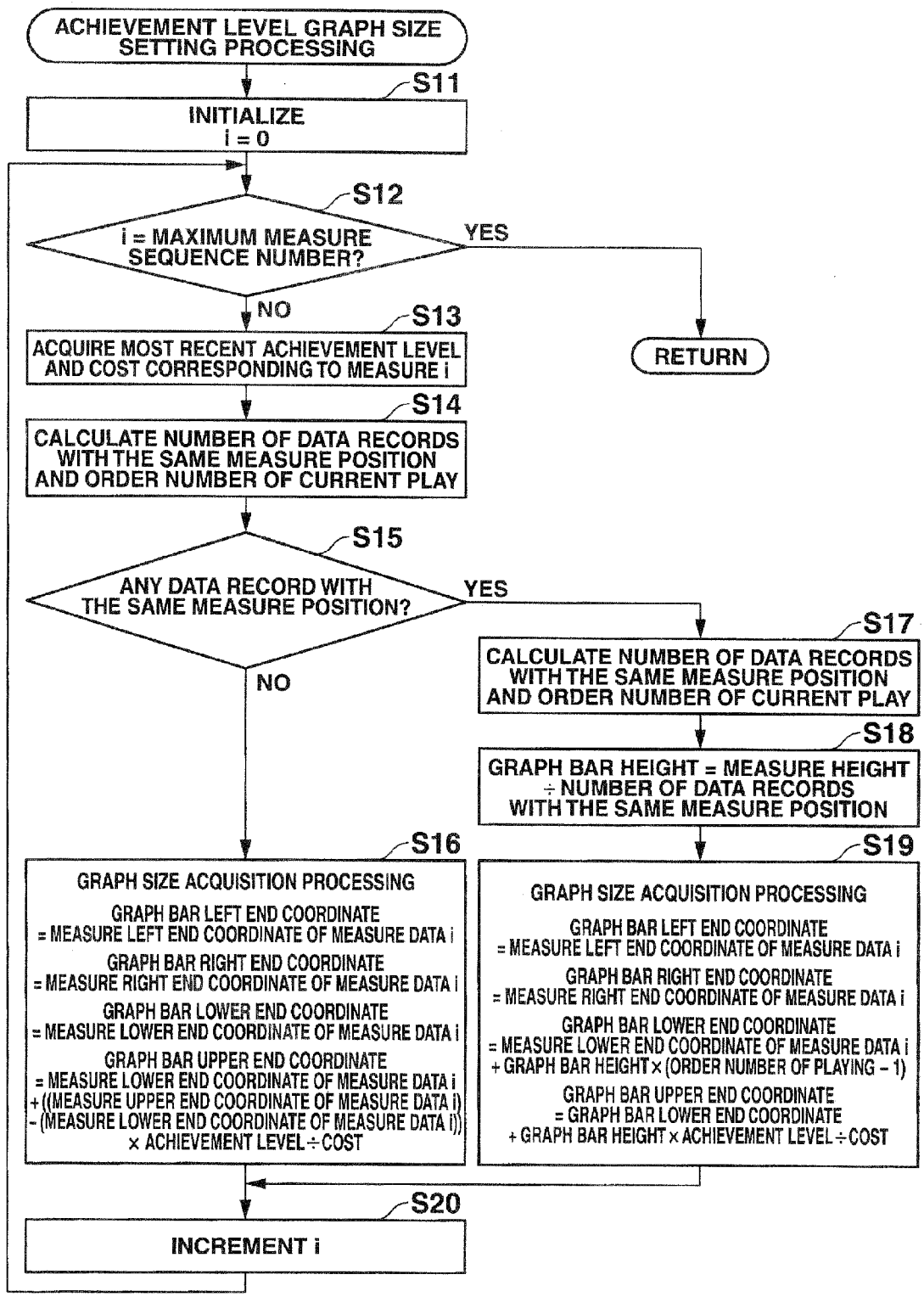
FIG. 5 is a flowchart showing achievement level graph size setting processing that is executed in the music score display device in accordance with the embodiment of the present invention.

FIG. 5 is a flowchart showing the achievement level graph size setting processing that is executed in the music score display device in accordance with the embodiment of the present invention.

In step S11, the CPU 11 initializes a variable i (i=0).

In step S12, the CPU 11 makes a determination as to whether i is at a maximum measure sequence number. If the result of this determination is affirmative, the achievement level graph size setting processing ends, and if the result is negative, the processing advances to step S13. The meaning of the term "maximum measure sequence number" as used herein includes a maximum value of the measure sequence numbers, that is, the overall number of measures to be played, including repeats.

In step S13, the CPU 11 acquires a most recent achievement level and cost corresponding to measure i. Specifically, the CPU 11 refers to the achievement level data table, reads the achievement level data 0 for the measure sequence number corresponding to the value of i, and acquires the achievement level and cost stored in the achievement level data 0.

In step S14, the CPU 11 calculates the total number of data records with the same measure position as measure i, and an order number among these at which measure i is played. Specifically, the CPU 11 calculates these values from the measure sequence numbers and measure position numbers of coordinate data 1 to n in the coordinate data table. For example, in the example of a music score in FIG. 9a, there are two measure serial numbers corresponding to the measure position number "9", which are measure serial numbers "9" and "25". For the order in which these measures are played, a measure with a smaller measure sequence number is played first. Therefore, for measure sequence number "9", the number of data records with the same measure position is two and the order number is first. For measure sequence number "25", the order number of playing is second. There is one measure sequence number corresponding to measure position number "2", which is measure sequence number "2".

Therefore, for measure position number "2", the number of data records with the same measure position is one.

In step S15, the CPU 11 makes a determination as to whether there is a plural number of data records with the same measure position for measure sequence number i. If the result of the determination is affirmative, the processing advances to step S17, and if the result is negative, the processing advances to step S16.

In step S16, the CPU 11 carries out processing to acquire the size of a graph. Specifically, the CPU 11 extracts the coordinate data for which the measure sequence number is i from the coordinate data, sets a graph bar left end coordinate to the measure left end coordinate of measure sequence number i, sets a graph bar right end coordinate to the measure right end coordinate of measure sequence number i, sets a graph bar lower end coordinate to the measure lower end coordinate of measure sequence number i, and sets a graph bar upper end coordinate to the measure lower end coordinate of measure sequence number i+((the measure upper end coordinate of measure sequence number i)−(the measure lower end coordinate of measure sequence number i))×the achievement level÷the cost. The values acquired in step S13 are used for the achievement level and the cost.

In step S17, the CPU 11 calculates the number of data records with the same measure position as measure i, and the order number at which measure i is played. In concrete terms, step S17 is the same as step S14.

In step S18, the CPU 11 sets a graph bar height to the height of the measure÷the number of data records with the same measure position.

In step S19, the CPU 11 carries out processing to acquire a size of the graph. Specifically, the CPU 11 extracts the coordinate data for which the measure sequence number is i from the coordinate data, sets the graph bar left end coordinate to the measure left end coordinate of measure sequence number i, sets the graph bar right end coordinate to the measure right end coordinate of measure sequence number i, sets the graph bar lower end coordinate to the measure lower end coordinate of measure sequence number i+the graph bar height×(the order number of playing−1), and sets the graph bar upper end coordinate to the graph bar lower end coordinate+the graph bar height×the achievement level÷the cost. The values acquired in step S13 are used for the achievement level and the cost.

In step S20, the CPU 11 increments i (increases i by 1).

Figure 6:
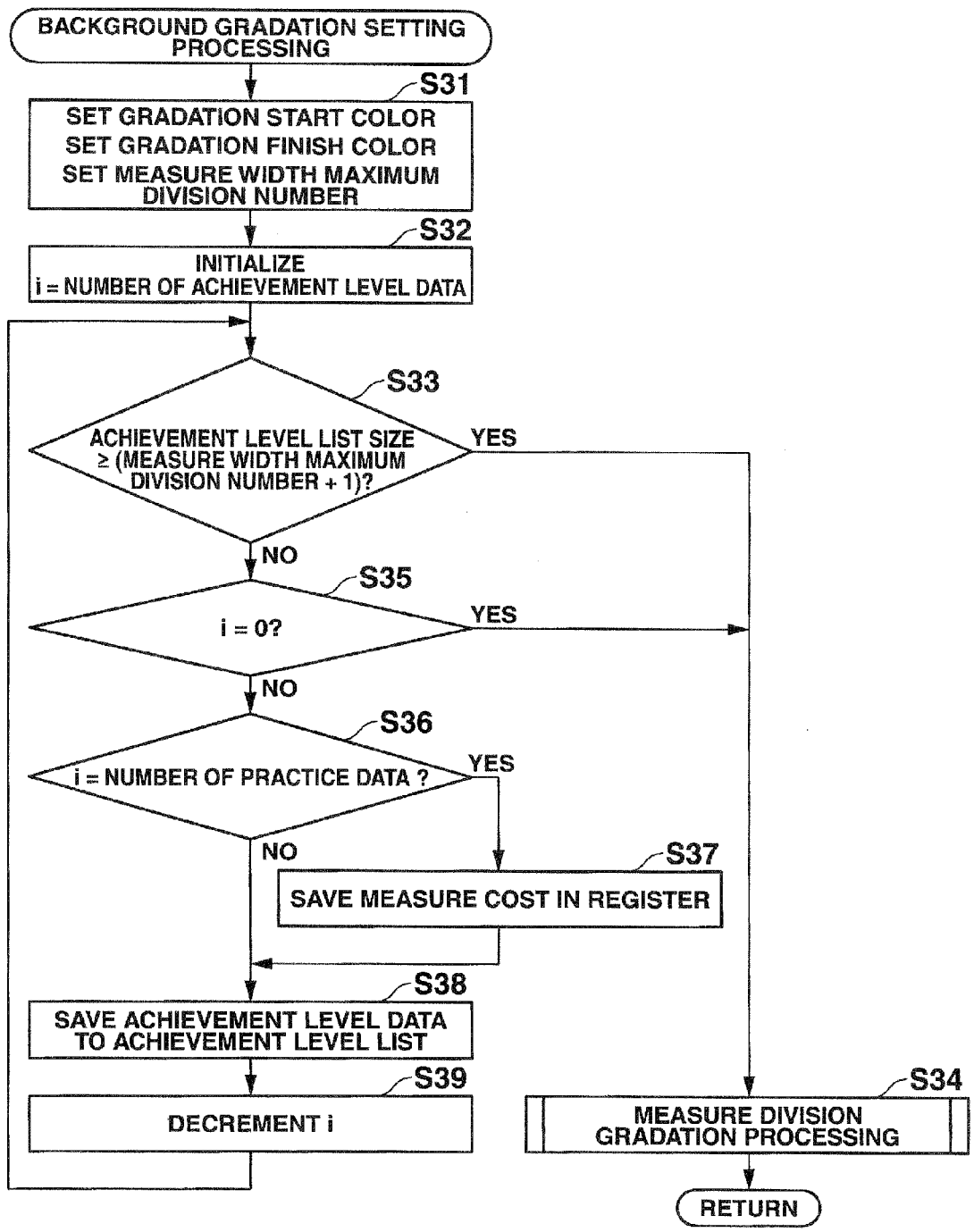
FIG. 6 is a flowchart showing background gradation setting processing that is executed in the music score display device in accordance with the embodiment of the present invention.

FIG. 6 is a flowchart showing the background gradation setting processing that is executed in the music score display device in accordance with the embodiment of the present invention.

In step S31, the CPU 11 sets a gradation start color, a gradation finish color, and a maximum number of divisions in the width of the measure. In the present embodiment, the gradation start color is set to, for example, gray with a maximum transparency, the gradation finish color is set to, for example, gray with a minimum transparency, and the measure width maximum division number is set to, for example, 10.

In step S32, the CPU 11 initializes a variable i (i=the number of achievement level data records for the measure).

In step S33, the CPU 11 makes a determination as to whether the size of an achievement level list (a number of achievement level data records) is at least the measure width maximum division number+1. If the result of the determination is affirmative, the CPU 11 advances the processing to step S34, and if the result is negative, the processing advances to step S35.

In step S35, the CPU 11 makes a determination as to whether i=0. If the result of this determination is affirmative, the processing advances to step S34, and if the result is negative, the processing advances to step S36.

In step S36, the CPU 11 makes a determination as to whether i=a number of practice data records (the number of achievement level data records). If the result of the determination is affirmative, the processing advances to step S37, and if the result is negative, the processing advances to step S38.

In step S37, the CPU 11 saves the cost of the measure on which the gradation image is to be displayed in a register.

In step S38, the CPU 11 saves achievement level data to the achievement level list. In step S39, the CPU 11 decrements (reduces i by 1).

Figure 7:
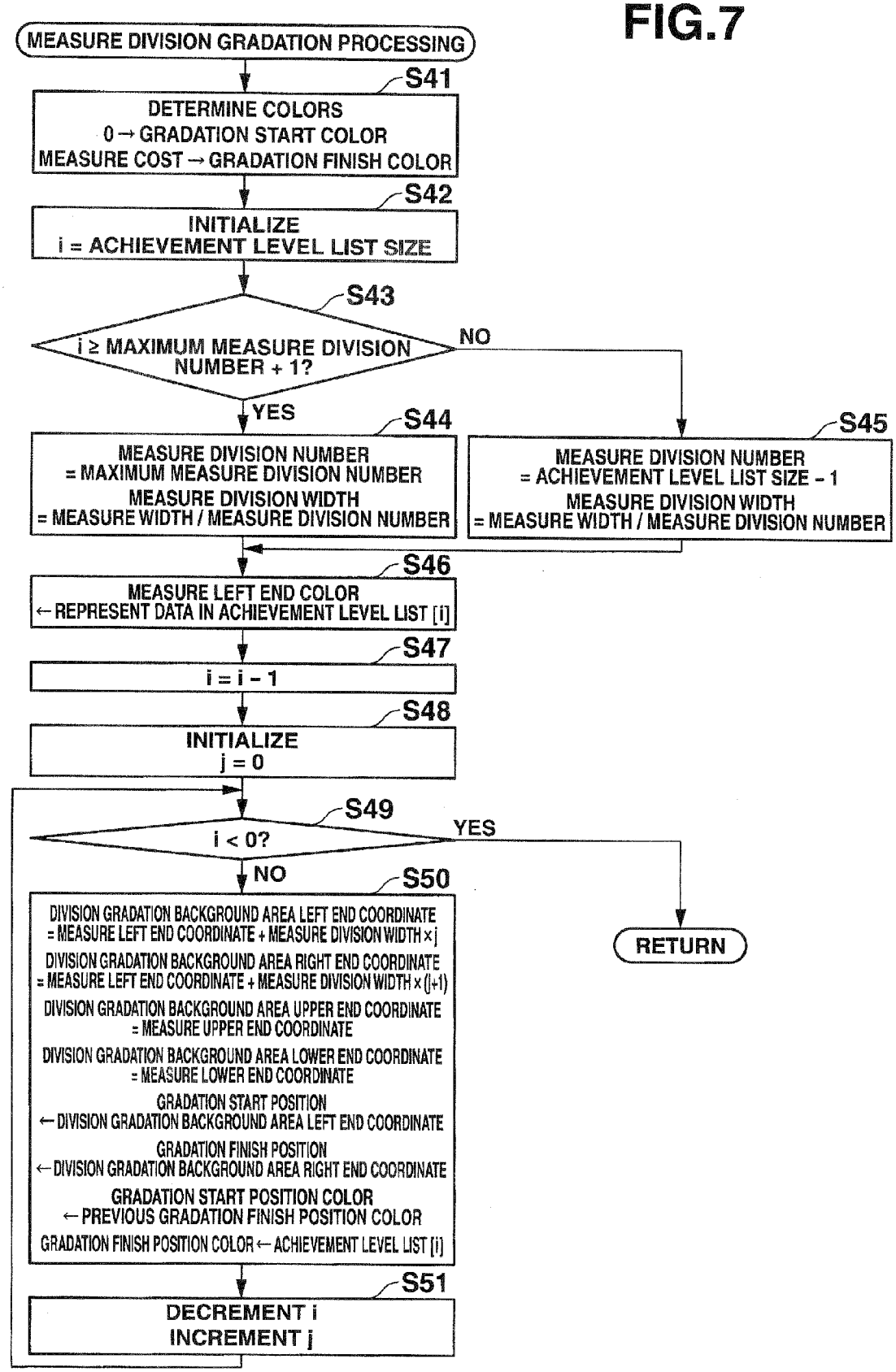
FIG. 7 is a flowchart showing measure division gradation processing that is executed in the music score display device in accordance with the embodiment of the present invention.

FIG. 7 is a flowchart showing the measure division gradation processing that is executed in the music score display device in accordance with the embodiment of the present invention.

Figures 8A, 8B:
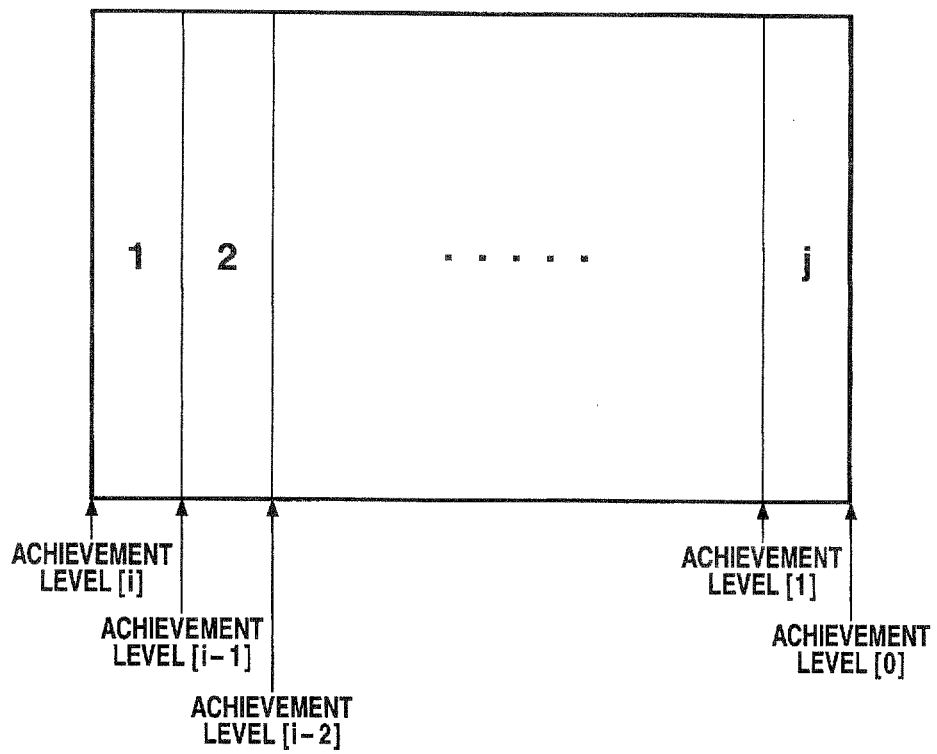
FIG. 8a and FIG. 8b are diagrams showing measure division gradations in accordance with the embodiment of the present invention.

In step S41, the CPU 11 associates the gradation start color and gradation finish color set in step S31 with, respectively, an achievement level of 0% and the cost of the measure (an achievement level of 100%). Thus, as illustrated in FIG. 8b, the gradations get darker (the transparency level falls) as the achievement level rises.

In step S42, the CPU 11 initializes a variable i (i=the size of the achievement level list).

In step S43, the CPU 11 makes a determination as to whether i is at least a maximum measure division number+1. If the result of the determination is affirmative, the processing advances to step S44, and if the result is negative, the processing advances to step S45.

In step S44, the CPU 11 sets a measure division number to the maximum measure division number, and sets a measure division width to the width of the measure÷the measure division number. The CPU 11 resets the variable i to the maximum measure division number+1.

In step S45, the CPU 11 sets the measure division number to the size of the achievement level list−1, and sets the measure division width to the width of the measure÷the measure division number.

In step S46, the CPU 11 represents the data in record [i] of the achievement level list with the color at the left end of the measure. Specifically, the CPU 11 displays an image with a color corresponding to the achievement level of achievement level list [i] at the left end of the measure. More specifically, an image with a gradation color corresponding to the achievement level shown at the top of FIG. 8b is displayed at the left side of the measure shown in FIG. 8a.

In step S47, the CPU 11 decrements i to i−1. In step S48, the CPU 11 initializes a variable j (j=0).

In step S49, the CPU 11 makes a determination as to whether or not i is less than 0. If the result of the determination is affirmative, the measure division gradation processing ends, and if the result is negative, the processing advances to step S50.

In step S50, the CPU 11 carries out gradation image display processing. Specifically, the CPU 11 sets a division gradation background area left end coordinate to the measure left end coordinate+the measure division width×j, sets a division gradation background area right end coordinate to the measure left end coordinate+the measure division width×(j+1), sets a division gradation background area upper end coordinate to the measure upper end coordinate, sets a division gradation background area lower end coordinate to the measure lower end coordinate, sets a gradation start position to the division gradation background area left end coordinate, sets a gradation finish position to the division gradation background area right end coordinate, sets the color at the gradation start position to the color of the previous gradation final position (if the value of j is at least 1), and sets the color at the gradation final position to a color corresponding to the achievement level of achievement level list [i].

In step S51, the CPU 11 decrements i (reduces i by 1), and increments j (increases j by 1). Then the CPU 11 advances the processing to step S49. In this manner, the processing of step S50 is carried out for values of i from (the achievement level list size−1) to 0. Thus, i gradation images from achievement level list [i−1] to achievement level list [0] may be displayed overlaid on the measure.

Specifically, as shown in FIG. 8a, a gradation image corresponding to the achievement level of achievement level list [i−1] is displayed in the leftmost division region, gradation images are successively displayed going to the right one region at a time, and a gradation image corresponding to the achievement level of achievement level list [0] is displayed in the rightmost gradation region.

Figure 9A:
FIG. 9a and FIG. 9b are diagrams showing examples of the display of measure division gradation images and achievement level graph images on a music score.
Figure 9B:
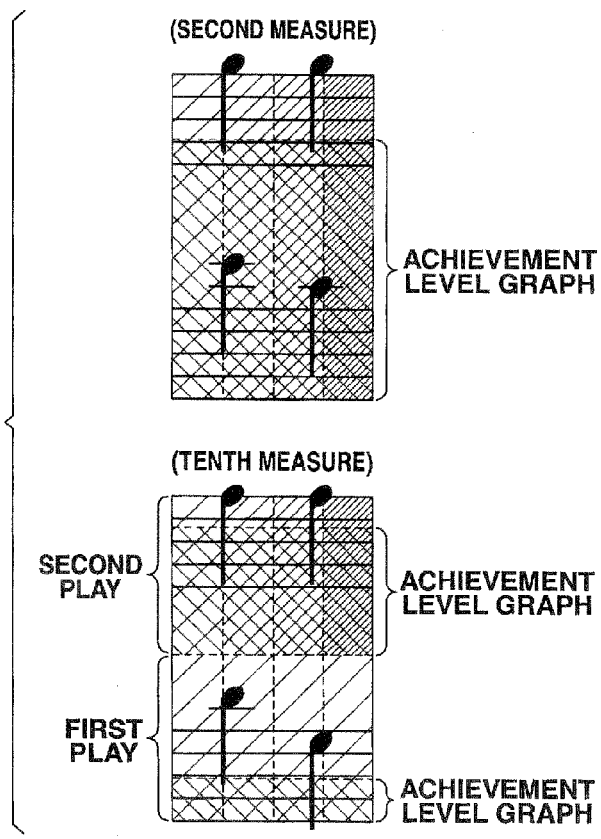

FIG. 9a and FIG. 9b are diagrams showing examples of the display of measure division gradation images and achievement level graph images on a music score. FIG. 9a is an example of a music score that is an object of practice, and FIG. 9b is display examples of measure division gradation images and achievement level graph images.

According to FIG. 9a, the first to eighth measures are played only once without being repeated but the ninth to twenty-fourth measures are repeated and played twice. Therefore, for example, the measure with the measure position number "2", is associated only with the measure sequence number "2", but the measure with the measure position number "10" is associated with two measure sequence numbers, "10" and "26", of which measure sequence number "10" is the first play and measure sequence number "26" is the second play.

According to FIG. 9b, in the display examples of the second measure and the tenth measure, the size of the achievement level list is 5. The gradation images are displayed with the measure division number being 4 (5−1), and the achievement level graph is displayed in accordance with the most recent achievement level in the achievement level list. According to the second measure, the gradation images get darker (the achievement level rises) toward the right, and the achievement level graph is high in accordance with the rightmost gradation image density being dark (the achievement level being high).

According to the tenth measure, the playing result when the measure sequence number is "10", which is the first time of playing, is shown in a lower portion, and the playing result when the measure sequence number is "26", which is the second time of playing, is shown in an upper portion. According to the lower portion, the gradation images are constant at a light density (the achievement level does not change but stays low), and in accordance with the rightmost gradation image density being light (the achievement level being low), the graph is low. In contrast, according to the upper portion, the gradation images get darker toward the right (the achievement level rises), and in accordance with the rightmost gradation image density being dark (the achievement level being high), the graph is high.

Thus, a user, by seeing the gradation images and achievement level graph images that are displayed such that the measures are visible, may check the history of practice results and the most recent practice results while looking at the music score, and may intuitively understand the state of practice.

The music score display device 1 of the present embodiment is equipped with a display (the display section 16) that displays a music score and a storage unit (the RAM 13) that stores in advance, in accordance with a number of times of practice, a pre-specified maximum score corresponding to the difficulty of playing (the cost) for each measure in the music score and obtained scores (achievement levels) obtained as playing results of each measure. The CPU 11 extracts the costs and achievement levels in the most recent practice from the RAM 13 and, on the basis of the extracted costs and achievement levels, displays graph images representing the results of the most recent practice for the respective measures (the achievement level graph), overlaid on the measure images of the music score displayed at the display section 16, such that the measure images are visible.

Thus, the user, by seeing the achievement level graph images that are displayed such that the measure images are visible, may check the most recent practice results while looking at the music score, and may intuitively understand the state of practice.

The CPU 11 of the music score display device 1 of the present embodiment extracts the costs and the history of achievement levels and, on the basis of the extracted costs and history of achievement levels, displays gradation images representing the history of practice results for each measure, overlaid on the measure images of the music score displayed at the display section 16, such that the measure images are visible.

Thus, the user, by seeing the gradation images and the achievement level graph images that are displayed such that the measure images are visible, may check the practice results history and the most recent practice results while looking at the music score, and may intuitively understand the state of practice.

The CPU 11 of the music score display device 1 of the present embodiment calculates the number of repeat plays for each measure of the music score and, for each measure for which the calculated number of repeats is a plural number, divides the measure image of that measure into a plural number of divisions and displays the achievement level graph images overlaid on the divisions of the measure image.

Thus, a user, by seeing the achievement level graph images for each repetition of playing of a measure that is repeatedly played, may intuitively understand the state of practice.

The present invention is not limited to the embodiment described above, and it will be clear to those skilled in the art that numerous modifications are possible within the scope of the invention recited in the attached claims and that such modifications are to be encompassed by the scope of the present invention.

It should be noted that the steps in the present specification describing the program recorded in the storage medium include not only processing executed in a time series following this order, but also processing that is not necessarily executed in a time series but is executed in parallel or individually.

Moreover, the term "system" as used in the present specification is intended to include the whole of equipment constituted by plural devices, plural units and the like.

A number of embodiments of the present invention are explained hereabove. These embodiments are merely examples and do not limit the technical scope of the invention. The present invention may be attained by numerous other embodiments, and numerous modifications such as omissions, substitutions and the like are possible within a technical scope not departing from the spirit of the invention. These embodiments and modifications are to be encompassed by the scope and gist of the invention recited in the present specification, etc., and are encompassed by the inventions recited in the attached claims and their equivalents.

What is claimed is:

1. A music score display device comprising:
    a display controller that displays a music score representing a predetermined piece of music at a predetermined display;
    a memory that stores a point value representing an achievement level attained by a user for each of a plurality of measures of the music score when the predetermined piece of music is played by the user;
    a graph image generator that, based on the point value of each measure stored in the memory, generates a graph image representing the point value of each measure; and
    an overlay display that displays the graph image of each measure generated by the graph image generator, superposed on an image of the corresponding measure of the music score displayed at the predetermined display, such that the image of the measure is visible.

2. The music score display device according to claim 1, wherein a plurality of point values of each measure corresponding to previous plays are stored in the memory, and
    the graph image generator divides an image area of a given measure into a number of divisions based on a number of the point values stored in the memory for the given measure, the divisions being oriented in a vertical direction, and generates graph images representing respectively corresponding point values in the divisions of the image area.

3. The music score display device according to claim 1, wherein if a predetermined measure is repeatedly played when the piece of music is played by the user, the point value for each repeat play of the measure is stored in the memory, and
    the graph image generator divides an image area of the predetermined measure into a number of divisions corresponding to a number of point values of repeat plays to be stored in the memory, the divisions being oriented in a horizontal direction, and generates graph images representing the point values of the respectively corresponding repeat plays in the divisions of the image area.

4. A music score display method comprising:
    displaying a music score representing a predetermined piece of music at a predetermined display;
    storing, in a memory, a point value representing an achievement level attained by a user for each of a plurality of measures of the music score when the predetermined piece of music is played by the user;
    based on the point value of each measure stored in the memory, generating a graph image representing the point value of each measure; and
    displaying the generated graph image of each measure, superposed on an image of the corresponding measure of the music score displayed at the predetermined display, such that the image of the measure is visible.

5. The music score display method according to claim 4, wherein a plurality of point values of each measure corresponding to previous plays are stored in the memory, and
    the generating the graph image includes dividing an image area of a given measure into a number of divisions based on a number of the point values stored in the memory for the given measure, the divisions being oriented in a vertical direction, and generating graph images representing respectively corresponding point values in the divisions of the image area.

6. The music score display method according to claim 4, wherein if a predetermined measure is repeatedly played when the piece of music is played by the user, the storing includes storing the point value for each repeat play of the measure in the memory, and
    the generating the graph image includes dividing an image area of the predetermined measure into a number of divisions based on a number of point values of repeat plays to be stored in the memory, the divisions being oriented in a horizontal direction, and generating graph images representing the point values of the respectively corresponding repeat plays in the divisions of the image area.

7. A non-transitory computer readable storage medium having stored therein a program executable by a computer that controls a music score display device equipped with a memory that, when a predetermined piece of music is played by a user, stores a point value representing an achievement level attained by the user for each of a plurality of measures of a music score representing the predetermined piece of music played by the user, the program being executable to control the computer to execute functions comprising:
    displaying the music score representing the predetermined piece of music at a predetermined display;
    based on the point value of each measure stored in the memory, generating a graph image representing the point value of each measure; and
    displaying the generated graph image of each measure, superposed on an image of the corresponding measure of the music score displayed at the predetermined display, such that the image of the measure is visible.

8. The storage medium according to claim 7, wherein a plurality of point values of each measure corresponding to previous plays are stored in the memory, and
    the generating the graph image includes dividing an image area of a given measure into a number of divisions based on a number of the point values stored in the memory for the given measure, the divisions being oriented in a vertical direction, and generating graph images representing respectively corresponding point values in the divisions of the image area.

9. The storage medium according to claim 7, wherein if a predetermined measure is repeatedly played when the piece of music is played by the user, the point value for each repeat play of the measure is stored in the memory, and
    the generating the graph image includes dividing an image area of the predetermined measure into a number of divisions based on a number of point values of repeat plays to be stored in the memory, the divisions being oriented in a horizontal direction, and generating graph images representing the point values of the respectively corresponding repeat plays in the divisions of the image area.

* * * * *